United States Patent
Venugopal et al.

(10) Patent No.: US 11,425,701 B2
(45) Date of Patent: Aug. 23, 2022

(54) DEFAULT SPATIAL RELATION DETERMINATION FOR A SOUNDING REFERENCE SIGNAL OR AN UPLINK CONTROL CHANNEL BEAM

(71) Applicant: QUALCOMM Incorporated, San Diego, CA (US)

(72) Inventors: Kiran Venugopal, Raritan, NJ (US); Yan Zhou, San Diego, CA (US); Jung Ho Ryu, Fort Lee, NJ (US); Tianyang Bai, Somerville, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/073,935

(22) Filed: Oct. 19, 2020

(65) Prior Publication Data
US 2021/0127388 A1  Apr. 29, 2021

Related U.S. Application Data

(60) Provisional application No. 62/926,266, filed on Oct. 25, 2019.

(51) Int. Cl.
*H04W 72/04* (2009.01)
*H04L 5/00* (2006.01)
*H04W 72/02* (2009.01)

(52) U.S. Cl.
CPC ......... *H04W 72/0413* (2013.01); *H04L 5/001* (2013.01); *H04W 72/02* (2013.01); *H04L 5/0048* (2013.01)

(58) Field of Classification Search
CPC .... H04W 72/02; H04W 72/0413; H04L 5/001
See application file for complete search history.

(56) References Cited

U.S. PATENT DOCUMENTS

2020/0305168 A1* 9/2020 Liou ................. H04W 72/0493
2021/0105780 A1* 4/2021 Jin .................... H04W 72/0493

FOREIGN PATENT DOCUMENTS

WO    WO-2019192472 A1 * 10/2019 ........... H04B 17/373

OTHER PUBLICATIONS

CATT: "Remaining Issues on Multi-Beam Enhancements", 3GPP Draft, R1-1912177, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823255, 6 Pages, Retrieved from the Internet: URL:https://ftp.3gpp.org/tsg_ran/WG1_RL1/TSGR1_99/Docs/R1-1912177.zip [retrieved on Nov. 9, 2019] Section 2.1. Proposal 2.

(Continued)

*Primary Examiner* — Kevin C. Harper
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may determine that a control resource set (CORESET) is not configured for an active downlink bandwidth part of a component carrier (CC) of the UE. The UE may determine that a transmission configuration indication (TCI) state is not activated for a physical downlink shared channel (PDSCH) of the active downlink bandwidth part of the CC. The UE may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC. Numerous other aspects are provided.

30 Claims, 10 Drawing Sheets

(56) References Cited

OTHER PUBLICATIONS

International Search Report and Written Opinion—PCT/US2020/070675—ISA/EPO—dated Feb. 8, 2021.
LG Electronics: "Discussion on Multi-Beam Based Operations and Enhancements", 3GPP Draft, 3GPP TSG RAN WG1 Meeting #98bis, R1-1910583 Multi-Beam_Final, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 5, 2019 (Oct. 5, 2019), XP051808600, 8 pages, Retrieved from the Internet: URL: https://ftp.3gpp.org/tsg_ran/WG1_RL1/TSGR1_98b/Docs/R1-1910583.zip R1-1910583 Multi-beam_final.doc [retrieved-on Oct. 5, 2019] Section 2.2, the Whole Document.
LG Electronics: "Feature Lead Summary#3 of Enhancements on Multi-Beam Operations", 3GPP Draft, R1-1911485, 3GPP TSG RAN WG1 Meeting #98bis, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 22, 2019 (Oct. 22, 2019), XP051798750, pp. 1-27, Retrieved from the Internet: URL:https://ftp.3gpp.org/tsg_ran/WG1_RL1/TSGR1_98b/Docs/R1-1911485.zip [retrieved on Oct. 22, 2019] Section 2.3.
OPPO: "Discussion on Multi-Beam Operation Enhancements", 3GPP Draft, R1-1911844, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1. No. Reno, USA, Nov. 18, 2019-Nov. 22, 2019, Nov. 8, 2019 (Nov. 8, 2019), XP051819865, 13 Pages, Retrieved from the Internet: URL:https://ftp.3gpp.org/tsg_ran/WG1_RL1/TSGR1_99/Docs/R1-1911844.zip [retrieved on Nov. 8, 2019] Section 2, Proposals 2 and 3.
Qualcomm Incorporated: "Enhancements on Multi-Beam Operation", 3GPP Draft, 3GPP TSG-RAN WG1 Meeting #98, R1-1909273, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019 (Aug. 17, 2019), XP051765878, 19 Pages, Retrieved from the Internet: URL: http://www.3gpp.org/ftp/tsg_ran/WG1_RL1/TSGR1_98/Docs/R1-1909273.zip [retrieved on Aug. 17, 2019] Section 7.4.
Qualcomm Incorporated: "Enhancements on Multi-Beam Operation", 3GPP Draft, R1-1912968, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18, 2019-Nov. 22, 2019, Nov. 9, 2019 (Nov. 9, 2019), XP051823730, pp. 1-20, Retrieved from the Internet: URL:https://ftp.3gpp.org/tsg_ran/WG1_RL1/TSGR1_99/Docs/R1-1912968.zip, R1-1912968 Enhancements on Multi-beam Operation.docx [retrieved on Nov. 9, 2019] sections 2.1, 2.2, 2.3, 2.5, 7.4.

\* cited by examiner

DEFAULT SPATIAL RELATION DETERMINATION FOR A SOUNDING REFERENCE SIGNAL OR AN UPLINK CONTROL CHANNEL BEAM

CROSS-REFERENCE TO RELATED APPLICATION

This patent application claims priority to U.S. Provisional Patent Application No. 62/926,266, filed on Oct. 25, 2019, entitled "DEFAULT SPATIAL RELATION DETERMINATION FOR A SOUNDING REFERENCE SIGNAL OR AN UPLINK CONTROL CHANNEL BEAM," and assigned to the assignee hereof. The disclosure of the prior application is considered part of and is incorporated by reference in this patent application.

FIELD OF THE DISCLOSURE

Aspects of the present disclosure generally relate to wireless communication and specifically, to techniques and apparatuses for default spatial relation determination for a sounding reference signal or an uplink control channel beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some examples, a base station may configure a UE with a spatial relation for an uplink channel or uplink signal. The spatial relation may define characteristics of an uplink beam used for the uplink channel or uplink signal. Alternatively, the UE may determine a default spatial relation for the uplink channel or uplink signal. In some examples, the UE may determine the default spatial relation for the uplink channel or uplink signal for a component carrier (CC) in frequency range 2 (FR2) based at least in part on a control resource set (CORESET) configured for the CC. If the UE is not configured with any CORESETs for the CC, then the UE may determine the default spatial relation for the uplink channel or uplink signal for the CC using an activated physical downlink shared channel (PDSCH) transmission configuration indication (TCI) state associated with the lowest identifier (for example, an activated PDSCH TCI state having an identifier with the smallest value) in the active downlink bandwidth part of the CC. However, in some examples, the UE may not be configured with any CORESETs for the CC, and the UE may not have any activated PDSCH TCI states for the CC. In such examples, the UE may not be able to determine a spatial relation to use for the uplink channel or uplink signal, and there may be a mismatch between a spatial relation used by the UE to transmit on the uplink channel or uplink signal and a spatial relation assumed by the base station to attempt to receive on the uplink channel or uplink signal.

SUMMARY

In some aspects, a method of wireless communication, performed by a user equipment (UE), may include determining that a control resource set (CORESET) is not configured for an active downlink bandwidth part of a component carrier (CC) of the UE. The method may include determining that a transmission configuration indication (TCI) state is not activated for a physical downlink shared channel (PDSCH) of the active downlink bandwidth part of the CC. The method may include determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a method of wireless communication, performed by a base station, may include determining that a CORESET is not configured for an active downlink bandwidth part of a CC of a UE. The method may include determining that a TCI state is not activated for a PDSCH of the active downlink bandwidth part of the CC. The method may include determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a method of wireless communication, performed by a base station, may include determining that no CORESETs are configured for an active downlink bandwidth part of a CC of a UE. The method may include determining that no TCI states are activated for any PDSCHs of the active downlink bandwidth part of the CC. The method may include configuring a CORESET for the active downlink bandwidth part of the CC or activating a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC.

In some aspects, a UE for wireless communication may include memory and one or more processors operatively coupled to the memory. The memory and the one or more processors may be configured to determine that a CORESET is not configured for an active downlink bandwidth part of a CC of the UE. The memory and the one or more processors may be configured to determine that a TCI state is not activated for a PDSCH of the active downlink bandwidth part of the CC. The memory and the one or more processors may be configured to determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a base station for wireless communication may include memory and one or more processors operatively coupled to the memory. The memory and the one or more processors may be configured to determine that a CORESET is not configured for an active downlink bandwidth part of a CC of a UE. The memory and the one or more processors may be configured to determine that a TCI state is not activated for a PDSCH of the active downlink bandwidth part of the CC. The memory and the one or more processors may be configured to determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a base station for wireless communication may include memory and one or more processors operatively coupled to the memory. The memory and the one or more processors may be configured to determine that no CORESETs are configured for an active downlink bandwidth part of a CC of a UE. The memory and the one or more processors may be configured to determine that no TCI states are activated for any PDSCHs of the active downlink bandwidth part of the CC. The memory and the one or more processors may be configured to configure a CORESET for the active downlink bandwidth part of the CC or activate a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC.

In some aspects, a non-transitory computer-readable medium may store one or more instructions for wireless communication. The one or more instructions, when executed by one or more processors of a UE, may cause the UE to determine that a CORESET is not configured for an active downlink bandwidth part of a CC of the UE. The one or more instructions may cause the UE to determine that a TCI state is not activated for a PDSCH of the active downlink bandwidth part of the CC. The one or more instructions may cause the UE to determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a non-transitory computer-readable medium may store one or more instructions for wireless communication. The one or more instructions, when executed by one or more processors of a base station, may cause the base station to determine that a CORESET is not configured for an active downlink bandwidth part of a CC of a UE. The one or more instructions may cause the base station to determine that a TCI state is not activated for a PDSCH of the active downlink bandwidth part of the CC. The one or more instructions may cause the base station to determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, a non-transitory computer-readable medium may store one or more instructions for wireless communication. The one or more instructions, when executed by one or more processors of a base station, may cause the one or more processors to: determine that no CORESETs are configured for an active downlink bandwidth part of a CC of a UE. The one or more instructions may cause the base station to determine that no TCI states are activated for any PDSCHs of the active downlink bandwidth part of the CC. The one or more instructions may cause the base station to configure a CORESET for the active downlink bandwidth part of the CC or activate a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC.

In some aspects, an apparatus for wireless communication may include means for determining that a CORESET is not configured for an active downlink bandwidth part of a CC of the apparatus. The apparatus may include means for determining that a TCI state is not activated for a PDSCH of the active downlink bandwidth part of the CC. The apparatus may include means for determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, an apparatus for wireless communication may include means for determining that a CORESET is not configured for an active downlink bandwidth part of a CC of a UE. The apparatus may include means for determining that a TCI state is not activated for a PDSCH of the active downlink bandwidth part of the CC. The apparatus may include means for determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

In some aspects, an apparatus for wireless communication may include means for determining that no CORESETs are configured for an active downlink bandwidth part of a CC of a UE. The apparatus may include means for determining that no TCI states are activated for any PDSCHs of the active downlink bandwidth part of the CC. The apparatus may include means for configuring a CORESET for the active downlink bandwidth part of the CC or activating a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
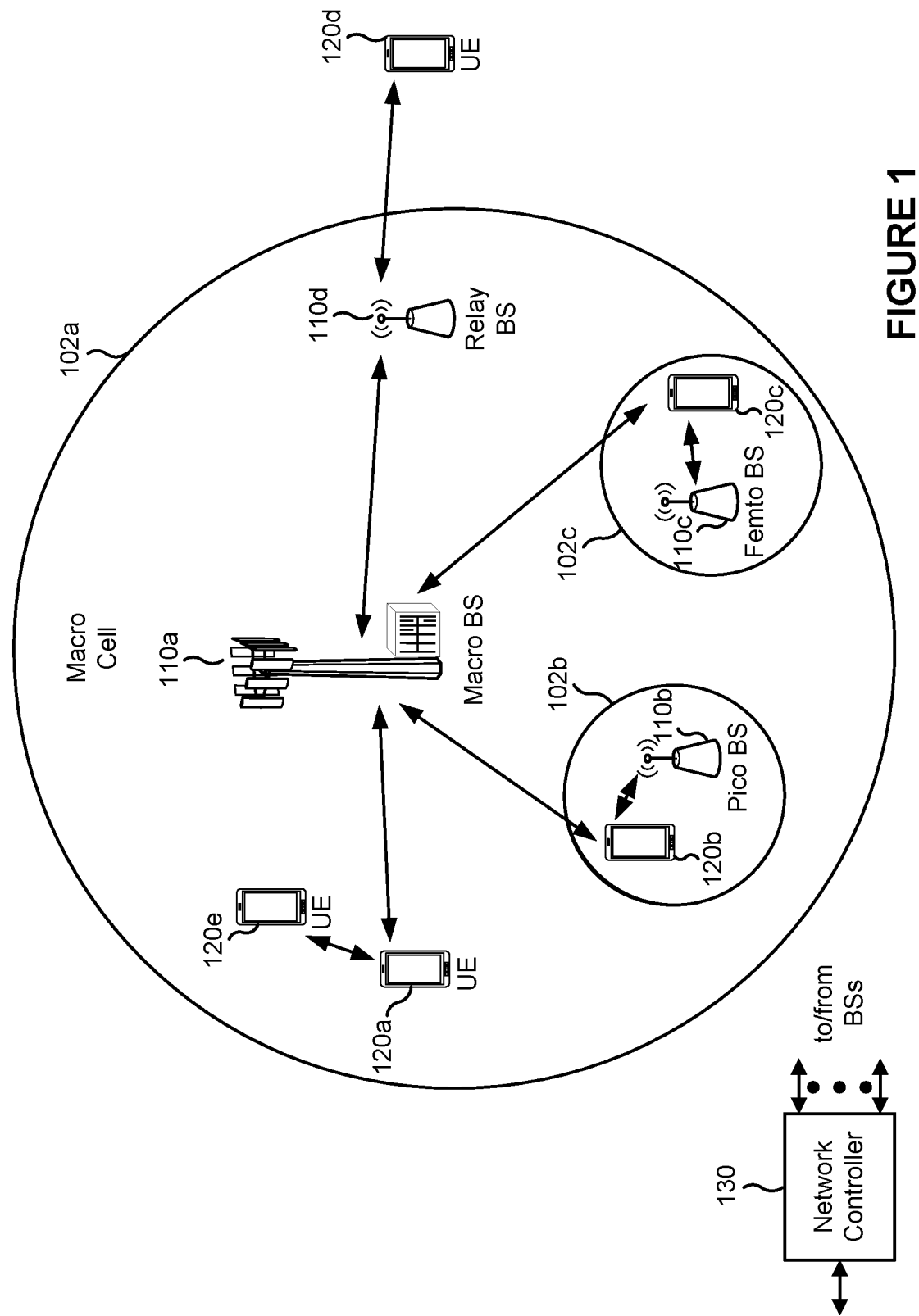
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In some examples, a base station may configure a user equipment (UE) with a spatial relation for an uplink channel or uplink signal. The spatial relation may define characteristics of an uplink beam used for the uplink channel or uplink signal. Alternatively, the UE may determine a default spatial relation for the uplink channel or uplink signal. In some aspects, the UE may determine the default spatial relation for an uplink channel or uplink signal for a component carrier (CC) in frequency range 2 (FR2) based at least in part on a control resource set (CORESET) configured for the CC. If the UE is not configured with any CORESETs for the CC, then the UE may determine the default spatial relation for the uplink channel or uplink signal for the CC using an activated physical downlink shared channel (PDSCH) transmission configuration indication (TCI) state associated with the lowest identifier (for example, an activated PDSCH TCI state having an identifier with the smallest value) in the active downlink bandwidth part of the CC. However, in some examples, the UE may not be configured with any CORESETs for the CC, and the UE may not have any activated PDSCH TCI states for the CC. In such examples, the UE may not be able to determine a spatial relation to use for the uplink channel or uplink signal, and there may be a mismatch between a spatial relation used by the UE to transmit on the uplink channel or uplink signal and a spatial relation assumed by the base station to attempt to receive on the uplink channel or uplink signal.

Various aspects relate generally to determining a default spatial relation for an uplink channel or an uplink signal. Some aspects more specifically relate to determining a default spatial relation for an uplink beam used for a sounding reference signal or an uplink control channel. In some aspects, a UE, a base station, or both may determine a spatial relation to be used for an uplink channel or an uplink signal on a CC when the CC is not configured with any CORESETs and when the CC does not have any activated PDSCH TCI states. In other words, a UE, a base station, or both may determine a spatial relation to be used for an uplink channel or an uplink signal on a CC when no CORESETs are configured for the CC and no TCI states are activated for any PDSCHs of the CC.

Particular aspects of the subject matter described in this disclosure can be implemented to realize one or more of the following potential advantages. In some examples, the described techniques can be used to resolve ambiguities between the UE and the base station regarding a spatial relation used when no CORESETs are configured for the CC and no TCI states are activated for any PDSCHs of the CC, thereby leading to improved channel estimation or selection of a more optimal beam than if the UE and the base station determined different spatial relations from one another. As a result of improved channel estimation, latency may be reduced, spectral efficiency may be improved, and reliability may be improved, among other examples, such as via the selection of better transmission parameters (e.g., a coding rate or a modulation and coding scheme) by the base station.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some examples, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
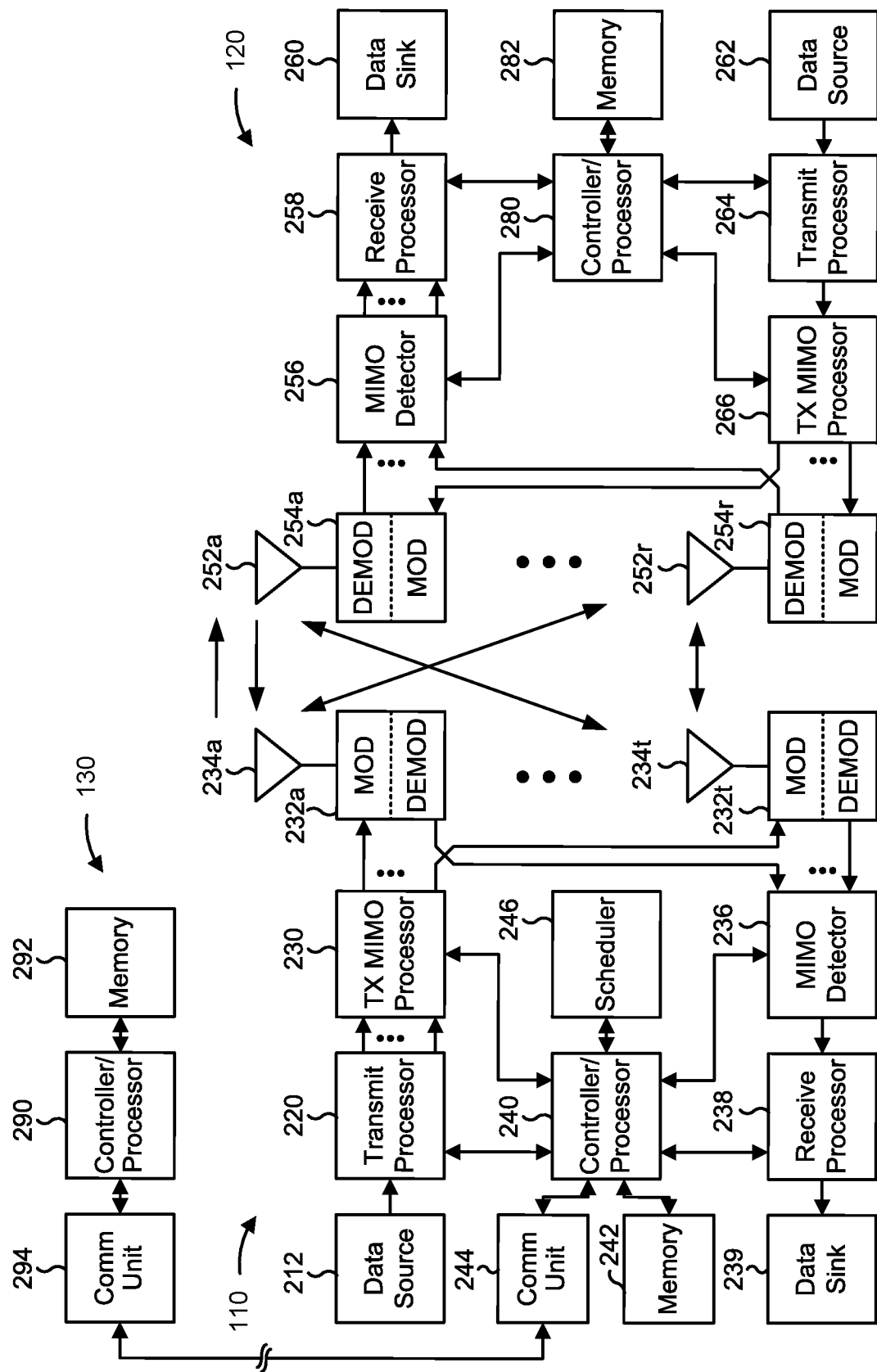
FIG. 2 is a block diagram illustrating an example base station in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with default spatial relation determination for a sounding reference signal (SRS) or an uplink control channel beam, as described in more detail elsewhere herein. For example, controller/processor 240 of base station 110, controller/processor 280 of UE 120, or any other component(s) of FIG. 2 may perform or direct operations of, for example, the process of FIG. 5, the process of FIG. 6, the process of FIG. 7, or other processes as described herein. Memories 242 and 282 may store data and program codes for base station 110 and UE 120, respectively. A scheduler 246 may schedule UEs for data transmission on the downlink or uplink.

In some aspects, UE 120 may include means for determining that a CORESET is not configured for an active downlink bandwidth part of a CC of the UE 120; means for determining that a TCI state is not activated for a PDSCH of the active downlink bandwidth part of the CC; means for determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC; among other examples, or combinations thereof. In some aspects, such means may include one or more components of UE 120 described in connection with FIG. 2.

In some aspects, base station 110 may include means for determining that a CORESET is not configured for an active downlink bandwidth part of a CC of a UE; means for determining that a TCI state is not activated for a PDSCH of the active downlink bandwidth part of the CC; means for determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC; among other examples, or combinations thereof. Additionally or alternatively, base station 110 may include means for determining that no CORESETs are configured for an active downlink bandwidth part of a CC of a UE; means for determining that no TCI states are activated for any PDSCHs of the active downlink bandwidth part of the CC; means for configuring a CORESET for the active downlink bandwidth part the CC or activating a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC; among other examples, or combinations thereof. In some aspects, such means may include one or more components of base station 110 described in connection with FIG. 2.

Figure 3:
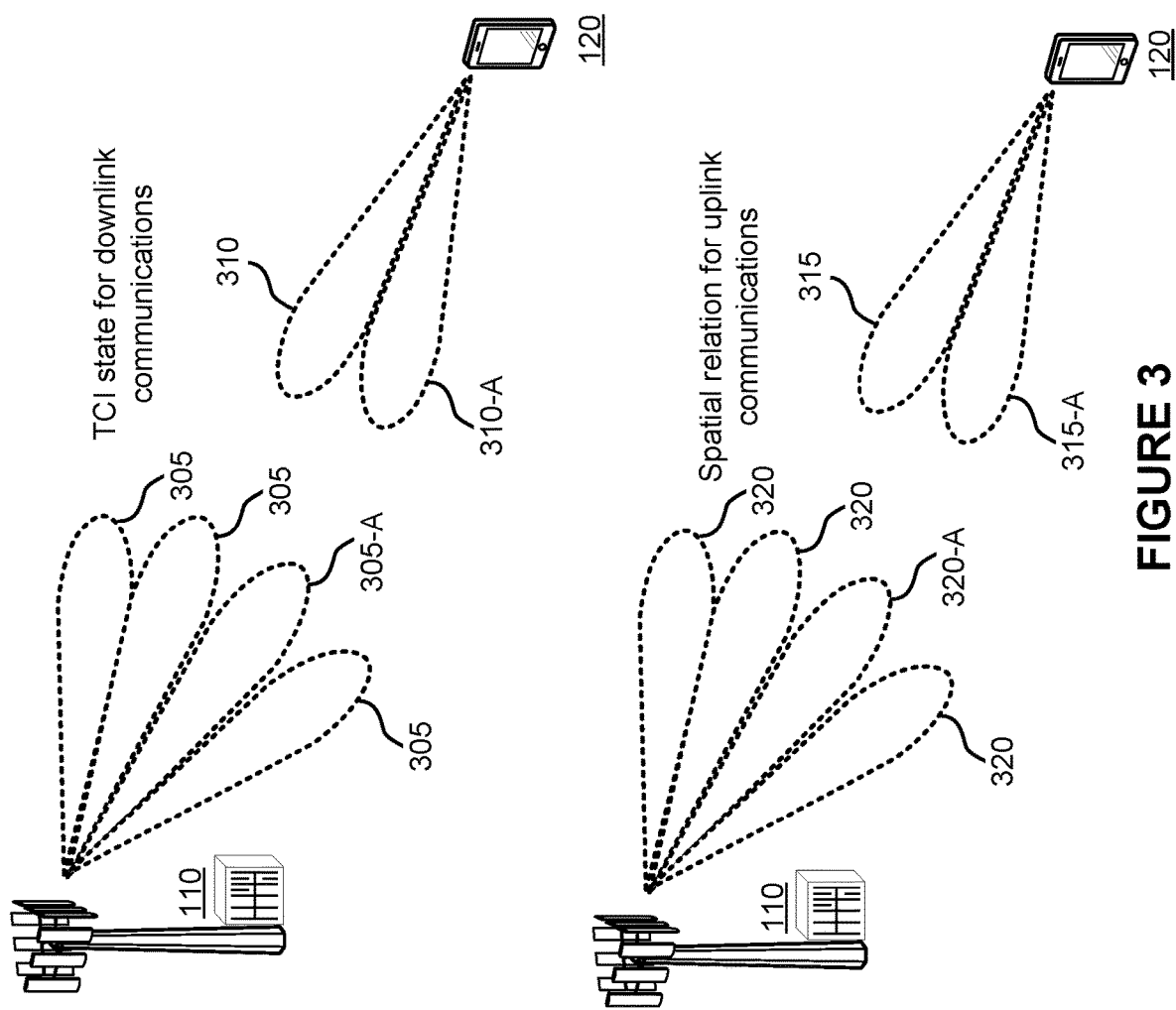
FIG. 3 is a diagram illustrating an example of using beams for communications between a base station and a UE in accordance with various aspects of the present disclosure.

FIG. 3 is a diagram illustrating an example of using beams for communications between a base station and a UE in accordance with various aspects of the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In examples where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

In some aspects, the base station 110 may configure the UE 120 with a spatial relation for an uplink channel or uplink signal, such as for an uplink beam to be used for transmission of an uplink signal (for example, a sounding reference signal (SRS)) by the UE 120 or to be used for transmissions on an uplink channel (for example, a PUCCH) by the UE 120 (sometimes referred to as an SRS/PUCCH beam or a PUCCH/SRS beam). Alternatively, the UE 120 may determine a default spatial relation for the SRS/PUCCH beam (for example, if the UE 120 is not configured with a spatial relation for the SRS/PUCCH beam). In some aspects, the UE 120 may determine the default spatial relation for an SRS/PUCCH beam for a component carrier (CC) in frequency range 2 (FR2) (for example, a millimeter wave frequency range) based at least in part on a default TCI state or a QCL assumption of a PDSCH on the CC. For example, if the UE 120 is configured with one or more CORESETs for the CC, then the UE 120 may determine the default spatial relation for the SRS/PUCCH beam for the CC using a TCI state of a CORESET having the lowest CORESET identifier (for example, a CORESET identifier having a smallest value) among all CORESETs monitored by the UE 120 in the most recent downlink slot (for the CC). If the UE 120 is not configured with any CORESETs for the CC, then the UE 120 may determine the default spatial relation for the SRS/PUCCH beam for the CC using an activated PDSCH TCI state associated with the lowest identifier (for example, an activated PDSCH TCI state having an identifier with the smallest value) in the active downlink bandwidth part of the CC.

However, in some examples, the UE 120 may not be configured with any CORESETs for the CC, and the UE 120 may not have any activated PDSCH TCI states for the CC. In such examples, the UE 120 may not be able to determine a spatial relation to use for the SRS/PUCCH beam, and there may be a mismatch between a spatial relation used by the UE 120 to transmit the SRSs or PUCCH communications on the SRS/PUCCH beam (for example, on a UE transmit beam 315) and a spatial relation assumed by the base station 110 to attempt to receive SRSs or PUCCH communications on the SRS/PUCCH beam (for example, on a BS receive beam 320). As a result, the base station 110 may be unable to properly receive SRSs, leading to poor channel estimation or selection of a sub-optimal beam, among other examples. Furthermore, the base station 110 may be unable to properly receive PUCCH communications, leading to data loss and reduced spectral efficiency due to retransmissions.

Some techniques and apparatuses described herein enable a UE 120 to determine a spatial relation to be used for an SRS/PUCCH beam on a CC when the CC is not configured with any CORESETs and when the CC does not have any activated PDSCH TCI states. These techniques and apparatuses may resolve ambiguities between the UE 120 and the base station 110 regarding a spatial relation used in this scenario, thereby leading to improved channel estimation or selection of a more optimal beam than if the UE 120 and the base station 110 determined different spatial relations from one another. As a result of improved channel estimation, latency may be reduced, spectral efficiency may be improved, and reliability may be improved, among other examples, such as via the selection of better transmission parameters by the base station 110.

Figure 4:
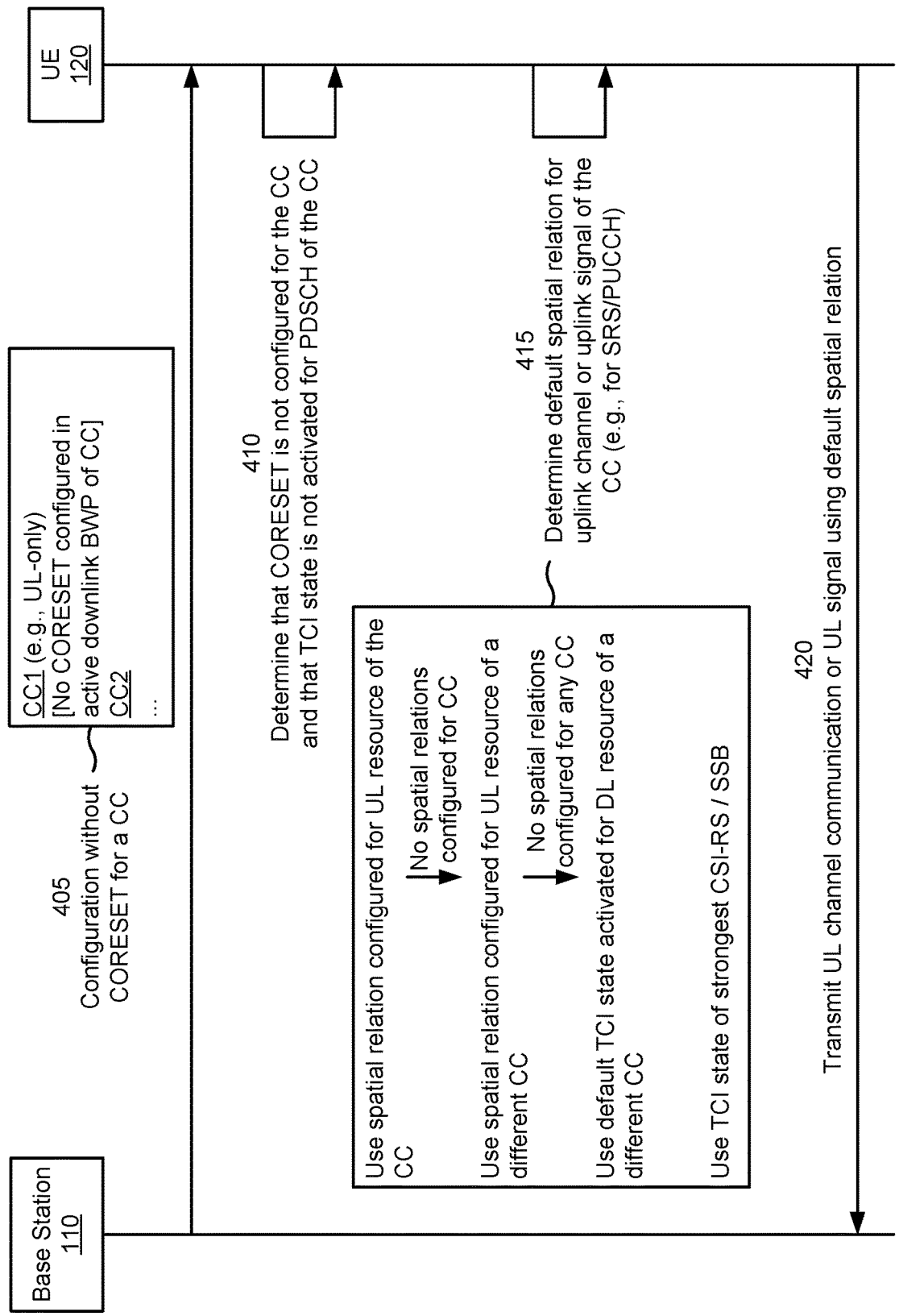
FIG. 4 is a diagram illustrating an example of default spatial relation determination for a sounding reference signal or an uplink control channel beam in accordance with various aspects of the present disclosure.

FIG. 4 is a diagram illustrating an example of default spatial relation determination for SRS or an uplink control channel beam in accordance with various aspects of the present disclosure. As shown in FIG. 4, a base station 110 and a UE 120 may communicate with one another.

In a first operation 405, the base station 110 may transmit, to the UE 120, a configuration for one or more CCs. In some aspects, the base station may transmit the configuration in an RRC message, such as an RRC configuration message or an RRC reconfiguration message. As shown, the configuration may configure a CC (shown as CC1) without a CORESET (e.g., in an active downlink bandwidth part of the CC). For example, the configuration may not include a CORESET configuration for the CC. In some aspects, the CC may be an uplink-only CC that is not used for downlink communication. In some aspects, the configuration may configure one or more other CCs (shown as CC2), one or more of which may be configured with a CORESET. As used herein, a configuration for a CC (or a configuration of a CC) may refer to a configuration for an active downlink bandwidth part (BWP) of the CC. An active downlink BWP may refer to a portion of a frequency band on which the UE is configured to communicate (e.g., on a CC) for downlink communication, and for which communications are activated (e.g., when the UE is capable of switching between different BWPs on a CC for communication).

In a second operation 410, the UE 120 may determine that a CORESET is not configured for a CC of the UE 120 (e.g., for an active downlink BWP of the CC), such as CC1. In other words, the UE 120 may determine that no CORESETs are configured for the CC (e.g., for an active downlink BWP of the CC). For example, the UE 120 may receive a configuration for the CC, and the configuration may not include a CORESET configuration for the CC.

Additionally, the UE 120 may determine that a TCI state is not activated for a PDSCH of the CC (for example, that a PDSCH TCI state is not activated for the CC). In other words, the UE 120 may determine that no PDSCH TCI states are activated for the CC (e.g., for the active downlink BWP of the CC). To activate a TCI state, the base station 110 may transmit a TCI state indicator to the UE 120. For example, the base station 110 may transmit the TCI state indicator in a medium access control (MAC) control element (CE), in downlink control information (DCI), or in an RRC message, among other examples. However, in some examples, the base station 110 may not transmit (for example, may refrain from transmitting) a TCI state indicator to the UE 120 for a PDSCH of the CC (e.g., for a PDSCH configure for an active downlink BWP of the CC). In such examples, the UE 120 may determine that no PDSCH TCI states are activated for the CC because the UE 120 does not receive any PDSCH TCI state indicators from the base station 110 for the CC. In some examples, if a TCI state indicator is not received by the UE 120, then the UE 120 may use a TCI state of a specific CORESET of the CC as the activated PDSCH TCI state. However, in the example of FIG. 4, the UE 120 does not have any CORESETs configured for the CC. As used herein, activation (or lack thereof) of a PDSCH TCI state for a CC may refer to activation (or lack thereof) of a PDSCH TCI state for an active downlink BWP of the CC.

In a third operation 415, the UE 120 may determine a default spatial relation for an uplink channel or uplink signal (for example, a PUCCH or an SRS) for the CC based at least in part on determining that no CORESETs are configured for the CC and that no PDSCH TCI states are activated for the CC. The uplink channel or uplink signal may be associated with an uplink beam (for example, an SRS/PUCCH beam), such as an uplink beam used for SRS transmissions, PUCCH transmissions, or both. As used herein, a default spatial relation may refer to a spatial relation that is not explicitly configured (such as in the configuration message described above). In some aspects, the UE 120 may determine the default spatial relation based at least in part on a rule, such as a rule that is specified according to a wireless communication standard.

In some aspects, the UE 120 may determine the default spatial relation based at least in part on a spatial relation configured for an uplink resource of the CC. For example, the default spatial relation may be the same as a spatial relation configured for an uplink resource of the CC. Additionally or alternatively, the UE 120 may determine one or more parameters (for example, spatial parameters) for the default spatial relation based at least in part on a spatial relation configured for an uplink resource of the CC.

The uplink resource may include, for example, a time resource, a frequency resource, a spatial resource, or an uplink channel. In some aspects, the uplink resource is an actual uplink resource (such as an actual uplink channel) available for uplink transmission. Alternatively, the uplink resource may be a virtual uplink resource (such as a virtual uplink channel). A virtual uplink resource may refer to an uplink resource defined for indicating a spatial relation, and may or may not be available for uplink transmission. In some aspects, the uplink resource may satisfy a condition relating to an identifier of the uplink resource. In such examples, the UE 120 may identify the uplink resource based at least in part on the condition. For example, the uplink resource may be an uplink channel (such as a PUCCH), and the condition may be that the uplink channel has a specific identifier. The specific identifier may be a fixed identifier, the lowest identifier among all uplink channels for which a spatial relation is configured for the CC, or the highest identifier among all uplink channels for which a spatial relation is configured for the CC, among other examples.

Additionally or alternatively, the UE 120 may determine the default spatial relation based at least in part on a spatial relation configured for an uplink resource (as described above) of a different CC (such as CC2) than the CC (such as CC1). For example, the default spatial relation may be the same as a spatial relation configured for an uplink resource of the different CC. Additionally or alternatively, the UE 120 may determine one or more parameters (for example, spatial parameters) for the default spatial relation based at least in part on a spatial relation configured for an uplink resource of the different CC. In some aspects, the UE 120 may determine that a spatial relation is not configured for any uplink resources of the CC, and may determine the default spatial relation based at least in part on a spatial relation configured for an uplink resource of a different CC than the CC based at least in part on determining that a spatial relation is not configured for any uplink resources of the CC.

In some aspects, the uplink resource may satisfy a condition relating to an identifier of the uplink resource. In such examples, the UE 120 may identify the uplink resource based at least in part on the condition. For example, the uplink resource may be an uplink channel (such as a PUCCH), and the condition may be that the uplink channel has a specific identifier. The specific identifier may be a fixed identifier, the lowest identifier among all uplink channels for which a spatial relation is configured for the different CC, or the highest identifier among all uplink channels for which a spatial relation is configured for the different CC, among other examples.

In some aspects, the different CC may satisfy a condition relating to an identifier of the different CC. In such examples, the UE 120 may identify the different CC (for example, a CC other than the CC for which no CORESETs are configured and for which no PDSCH TCI states are activated) based at least in part on the condition. For example, the condition may be that the different CC has a specific identifier. The specific identifier may be a fixed identifier, the lowest identifier among all CCs of the UE 120 for which a spatial relation is configured, or the highest identifier among all CCs of the UE 120 for which a spatial relation is configured, among other examples. Additionally or alternatively, the condition may be that the different CC is associated with one or more QCL properties that satisfy a condition. For example, the UE 120 may identify a different CC that has a threshold quantity of QCL properties in common with the CC, that has the most QCL properties in common with the CC among all CCs of the UE 120 for which a spatial relation is configured, or has a specific QCL property or a specific set of QCL properties in common with the CC, among other examples. Thus, the UE 120 may identify the different CC based at least in part on a first QCL property of the CC (or a first set of QCL properties of the CC) and a second QCL property of the different CC (or a second set of QCL properties of the different CC).

Additionally or alternatively, the UE 120 may determine the default spatial relation based at least in part on a default TCI state activated for a downlink resource of a different CC (such as CC2) than the CC (such as CC1). For example, the UE 120 may determine one or more parameters (for example, spatial parameters) for the default spatial relation based at least in part on a default TCI state activated for a downlink resource of the different CC (for example, using beam correspondence between uplink and downlink beams). In some aspects, the UE 120 may determine that a spatial relation is not configured for any uplink resources of any CCs of the UE 120, and may determine the default spatial relation based at least in part on a default TCI state activated for a downlink resource of a different CC than the CC based at least in part on determining that a spatial relation is not configured for any uplink resources of any CCs of the UE 120.

The downlink resource may include, for example, a time resource, a frequency resource, a spatial resource, or a downlink channel. In some aspects, the downlink resource is an actual downlink resource (such as an actual downlink channel) available for downlink transmission. Alternatively, the downlink resource may be a virtual downlink resource (such as a virtual downlink channel). A virtual downlink resource may refer to a downlink resource defined for indicating a TCI state, and may or may not be available for downlink transmission. In some aspects, the downlink resource may satisfy a condition relating to an identifier of the downlink resource. In such examples, the UE 120 may identify the downlink resource based at least in part on the condition. For example, the downlink resource may be a downlink channel (such as a PDCCH or a PDSCH, among other examples), and the condition may be that the downlink channel has a specific identifier. The specific identifier may be a fixed identifier, the lowest identifier among all downlink channels for which a TCI state is configured or activated for the different CC, or the highest identifier among all downlink channels for which a TCI state is configured or activated for the different CC, among other examples. Additionally or alternatively, the default TCI state may satisfy a condition relating to an identifier of the TCI state, such as by having a fixed TCI state identifier, by having the lowest TCI state identifier among all activated TCI states for the different CC, or by having the highest TCI state identifier among all activated TCI states for the different CC, among other examples.

In some aspects, the UE 120 may determine the default spatial relation based at least in part on a TCI state of a strongest measured CSI-RS or a strongest measured SSB. In some aspects, the UE 120 may signal the default spatial relation, determined by the UE 120, to the base station 110. If the UE 120 determines the default spatial relation based at least in part on a TCI state of a strongest measured CSI-RS or a strongest measured SSB, then the UE 120 may signal the strongest measured CSI-RS (for example, by transmitting a CSI-RS identifier or information that identifies a resource in which the CSI-RS was transmitted, among other examples) or the strongest measured SSB (for example, by transmitting an SSB index or information that identifies a resource in which the SSB was transmitted, among other examples) to the base station 110. The base station 110 may use this information to identify the default spatial relation. Additionally or alternatively, the UE 120 may signal the default spatial relation for a CC to the base station 110 as part of a procedure for initial configuration of the CC (for example, in an initial CC configuration, in a UE capability report, or in an RRC message, among other examples).

In some aspects, the UE 120 may use one or more techniques described above (for example, in connection with the third operation 415) if one or more pathloss reference signals are configured for the CC. In such examples, the UE 120 may determine that one or more pathloss reference signals are configured for the CC, and may determine the default spatial relation for the uplink channel or uplink signal for the CC (for example, using one or more techniques described above in connection with the third operation 415) based at least in part on determining that one or more pathloss reference signals are configured for the CC.

In some aspects, the UE 120 may use one or more techniques described above (for example, in connection with the third operation 415) if no pathloss reference signals are configured for the CC. In such examples, the UE 120 may determine that no pathloss reference signals are configured for the CC, and may determine the default spatial relation for the uplink channel or uplink signal for the CC (for example, using one or more techniques described above in connection with the third operation 415) based at least in part on determining that no pathloss reference signals are configured for the CC. In such examples, the UE 120 may derive one or more power control parameters for the uplink channel or uplink signal based at least in part on a downlink reference signal. In some aspects, the downlink reference signal may be a downlink reference signal on the CC if the CC has a downlink reference signal configured. Alternatively, the downlink reference signal may be a downlink reference signal on a different CC than the CC if the CC does not have a downlink reference signal configured. The different CC may be identified using one or more techniques described above (such as a condition or a QCL property). In some aspects, if the CC does not have a downlink reference signal configured, then the UE 120 may use a power control parameter associated with uplink communications of a different CC.

In a fourth operation 420, the UE 120 may transmit an uplink channel communication or an uplink signal using the default spatial relation. For example, the UE 120 may configure or beamform an uplink beam for the uplink channel or uplink signal using the default spatial relation. In some aspects, the UE 120 may transmit SRS to the base station 110 on the uplink beam using the default spatial relation. Additionally or alternatively, the UE 120 may transmit a PUCCH communication to the base station 110 on the uplink beam using the default spatial relation. In some aspects, the UE 120 may determine a power control parameter for the transmission on the uplink beam as described above.

Although the techniques described above focus on a determination of a default spatial relation by the UE 120 when a CC of the UE 120 is not configured with a CORESET and does not have an activated PDSCH TCI state, these techniques may also be used by a base station 110 to determine a default spatial relation for a CC when the CC is not configured with a CORESET and does not have an activated PDSCH TCI state. For example, the base station 110 may determine that no CORESETs are configured for a CC of a UE 120, may determine that no TCI states are activated for any PDSCHs of the CC, and may determine a default spatial relation for an uplink channel or uplink signal for the CC based at least in part on determining that no CORESETs are configured for the CC and that no TCI states are activated for any PDSCHs of the CC. The UE 120 and the base station 110 may use the same rule (for example, the same technique(s) described above) to determine the default spatial relation. In this way, there may not be any ambiguity between the UE 120 and the base station 110 regarding a spatial relation to be used, thereby leading to improved channel estimation or selection of a more optimal beam than if the UE 120 and the base station 110 determined different spatial relations from one another. As a result of improved channel estimation, latency may be reduced, spectral efficiency may be improved, and reliability may be improved, among other examples, such as via the selection of better transmission parameters by the base station 110.

In some aspects, the base station 110 may determine the default spatial relation based at least in part on an indication from the UE 120. For example, the UE 120 may signal a default spatial relation to the base station 110 in an RRC message, in a MAC CE, in uplink control information (UCI), as part of a procedure for initial configuration of the CC, by indicating a CSI-RS used to determine the default spatial relation, or by indicating an SSB used to determine the default spatial relation, among other examples. In some aspects, the base station 110 may implicitly determine the default spatial relation (for example, without an indication from the UE 120), such as by determining the default spatial relation based at least in part on an SSB used by the UE 120 for a random access channel (RACH) procedure, based at least in part on a most recently transmitted CSI-RS, or based at least in part on a most recently transmitted SSB, among other examples.

In some aspects, the base station 110 may not be permitted to configure a CC for a UE 120 without any CORESETs and without any activated PDSCH TCI states. In such examples, the UE 120 shall expect at least one of a CORESET or an activated PDSCH TCI state to exist (for example, to be configured or activated) for a CC. In such examples, if a CC is not configured with a CORESET, then an activated PDSCH TCI state must exist for the CC. To ensure this, the base station 110 may determine that no CORESETs are configured for a CC of a UE 120, may determine that no TCI states are activated for any PDSCHs of the CC, and may either configure a CORESET for the CC or activate a TCI state for a PDSCH of the CC based at least in part on determining that no CORESETs are configured for the CC and that no TCI states are activated for any PDSCHs of the CC. Additionally or alternatively, the base station 110 may determine that no CORESETs are configured for a CC of a UE 120, and may activate a TCI state for a PDSCH of the CC based at least in part on determining that no CORESETs are configured for the CC. Additionally or alternatively, the base station 110 may determine that no TCI states are activated for any PDSCHs of the CC, and may configure a CORESET for the CC based at least in part on determining that no TCI states are activated for any PDSCHs of the CC. In this way, the base station 110 may ensure that the UE 120 and the base station 110 determine the same spatial relation for an uplink channel or uplink signal of the CC.

Figure 5:
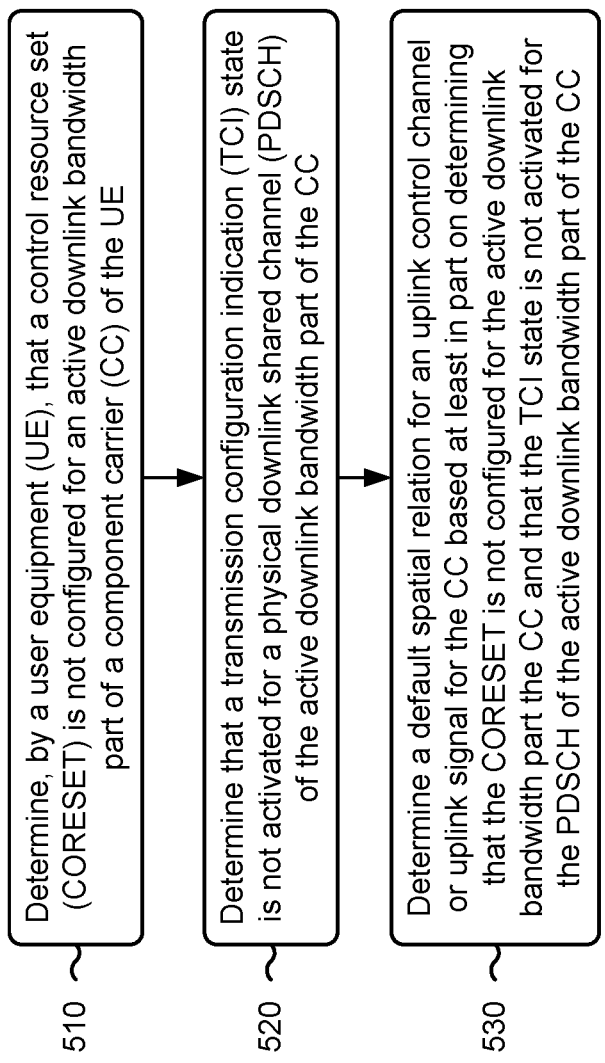
FIG. 5 is a flowchart illustrating an example process performed by a UE in accordance with various aspects of the present disclosure.

FIG. 5 is a flowchart illustrating an example process performed, for example, by a UE in accordance with various aspects of the present disclosure. The process is an example where the UE (for example, UE 120) performs operations associated with default spatial relation determination for an SRS or an uplink control channel beam.

As shown in FIG. 5, in some aspects, the process may include determining that a CORESET is not configured for an active downlink bandwidth part of a CC of the UE (block 510). For example, the UE (for example, using receive processor 258, transmit processor 264, controller/processor 280, memory 282, among other examples) may determine that a CORESET is not configured for an active downlink bandwidth part of a CC of the UE, as described above.

As further shown in FIG. 5, in some aspects, the process may include determining that a TCI state is not activated for a PDSCH of the active downlink bandwidth part of the CC (block 520). For example, the UE (for example, using receive processor 258, transmit processor 264, controller/processor 280, memory 282, among other examples) may determine that a TCI state is not activated for a PDSCH of the active downlink bandwidth part of the CC, as described above.

As further shown in FIG. 5, in some aspects, the process may include determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC (block 530). For example, the UE (for example, using receive processor 258, transmit processor 264, controller/processor 280, memory 282, among other examples) may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC, as described above.

The process may include additional aspects, such as any single aspect or any combination of aspects described below or in connection with one or more other processes described elsewhere herein.

In a first aspect, the uplink control channel or uplink signal is a physical uplink control channel or a sounding reference signal.

In a second aspect, alone or in combination with the first aspect, the process includes transmitting an indication of the default spatial relation to a base station as part of a procedure for initial configuration of the CC.

In a third aspect, alone or in combination with one or more of the first and second aspects, the default spatial relation is based at least in part on a spatial relation configured for an uplink resource of the CC.

In a fourth aspect, alone or in combination with one or more of the first through third aspects, the uplink resource is an actual uplink resource or a virtual uplink resource.

In a fifth aspect, alone or in combination with one or more of the first through fourth aspects, the uplink resource satisfies a condition relating to an identifier of the uplink resource.

In a sixth aspect, alone or in combination with one or more of the first through fifth aspects, the condition is that the uplink resource has the lowest identifier among uplink resources for which a spatial relation is configured for the CC.

In a seventh aspect, alone or in combination with one or more of the first through sixth aspects, the process includes determining that a spatial relation is not configured for any uplink resources of the CC; and determining the default spatial relation based at least in part on a spatial relation configured for an uplink resource of a different CC than the CC based at least in part on determining that a spatial relation is not configured for any uplink resources of the CC.

In an eighth aspect, alone or in combination with one or more of the first through seventh aspects, the default spatial relation is based at least in part on a spatial relation configured for an uplink resource of a different CC than the CC.

In a ninth aspect, alone or in combination with one or more of the first through eighth aspects, the uplink resource is an actual uplink resource or a virtual uplink resource.

In a tenth aspect, alone or in combination with one or more of the first through ninth aspects, the uplink resource satisfies a condition relating to an identifier of the uplink resource.

In an eleventh aspect, alone or in combination with one or more of the first through tenth aspects, the condition is that the uplink resource has the lowest identifier among uplink resources for which a spatial relation is configured for the different CC.

In a twelfth aspect, alone or in combination with one or more of the first through eleventh aspects, the different CC satisfies a condition relating to an identifier of the different CC.

In a thirteenth aspect, alone or in combination with one or more of the first through twelfth aspects, the condition is that the different CC has a lowest identifier among CCs of the UE for which a spatial relation is configured for an uplink resource.

In a fourteenth aspect, alone or in combination with one or more of the first through thirteenth aspects, the different CC is identified based at least in part on a first QCL property of the CC and a second QCL property of the different CC.

In a fifteenth aspect, alone or in combination with one or more of the first through fourteenth aspects, the process includes determining that a spatial relation is not configured for any uplink resources of any CC of the UE; and determining the default spatial relation based at least in part on a default TCI state activated for a downlink resource of a different CC than the CC based at least in part on determining that a spatial relation is not configured for any uplink resources of any CC of the UE.

In a sixteenth aspect, alone or in combination with one or more of the first through fifteenth aspects, the default spatial relation is based at least in part on a default TCI state activated for a downlink resource of a different CC than the CC.

In a seventeenth aspect, alone or in combination with one or more of the first through sixteenth aspects, the default spatial relation is based at least in part on a TCI state of a strongest measured CSI-RS or a strongest SSB.

In an eighteenth aspect, alone or in combination with one or more of the first through seventeenth aspects, the process includes transmitting an indication, to the base station, of the strongest measured CSI-RS or the strongest measured SSB.

In a nineteenth aspect, alone or in combination with one or more of the first through eighteenth aspects, the CC is an uplink-only CC.

In a twentieth aspect, alone or in combination with one or more of the first through nineteenth aspects, the process includes determining that one or more pathloss reference signals are configured for the CC; and determining the default spatial relation for the uplink control channel or uplink signal for the CC further based at least in part on determining that one or more pathloss reference signals are configured for the CC.

In a twenty-first aspect, alone or in combination with one or more of the first through twentieth aspects, the process includes determining that no pathloss reference signals are configured for the CC; and determining the default spatial relation for the uplink control channel or uplink signal for the CC further based at least in part on determining that no pathloss reference signals are configured for the CC.

In a twenty-second aspect, alone or in combination with one or more of the first through twenty-first aspects, the process includes deriving one or more power control parameters for the uplink control channel or uplink signal using a downlink reference signal based at least in part on determining that no pathloss reference signals are configured for the UE.

In a twenty-third aspect, alone or in combination with one or more of the first through twenty-second aspects, the downlink reference signal is on the CC if the CC has a downlink reference signal configured, or is on a different CC if the CC does not have a downlink reference signal configured.

In a twenty-fourth aspect, alone or in combination with one or more of the first through twenty-third aspects, the default spatial relation is determined based at least in part on a rule.

Although FIG. 5 shows example blocks of the process, in some aspects, the process may include additional blocks, fewer blocks, different blocks, or differently arranged blocks than those depicted in FIG. 5. Additionally or alternatively, two or more of the blocks of the process may be performed in parallel.

Figure 6:
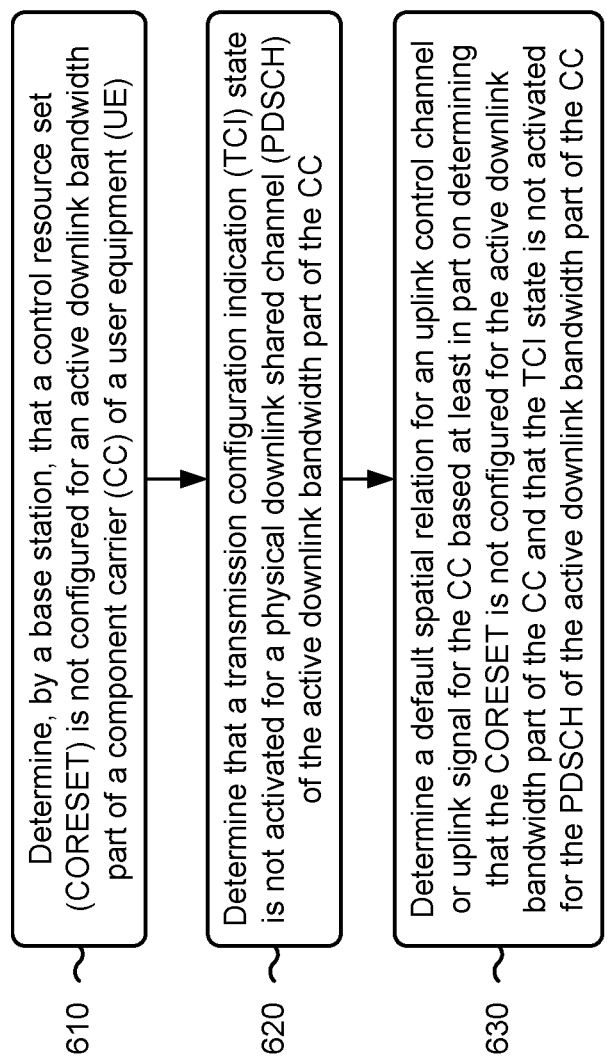
FIG. 6 is a flowchart illustrating an example process performed by a base station in accordance with various aspects of the present disclosure.

FIG. 6 is a flowchart illustrating an example process performed, for example, by a base station in accordance with various aspects of the present disclosure. The process is an example where the base station (for example, base station 110) performs operations associated with default spatial relation determination for an SRS or an uplink control channel beam.

As shown in FIG. 6, in some aspects, the process may include determining that a CORESET is not configured for an active downlink bandwidth part of a CC of a UE (block 610). For example, the base station (for example, using transmit processor 220, receive processor 238, controller/processor 240, memory 242, among other examples) may determine that a CORESET is not configured for an active downlink bandwidth part of a CC of a UE, as described above.

As further shown in FIG. 6, in some aspects, the process may include determining that a TCI state is not activated for a PDSCH of the active downlink bandwidth part of the CC (block 620). For example, the base station (for example, using transmit processor 220, receive processor 238, controller/processor 240, memory 242, among other examples) may determine that a TCI state is not activated for a PDSCH of the active downlink bandwidth part of the CC, as described above.

As further shown in FIG. 6, in some aspects, the process may include determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC (block 630). For example, the base station (for example, using transmit processor 220, receive processor 238, controller/processor 240, memory 242, among other examples) may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC, as described above.

The process may include additional aspects, such as any single aspect or any combination of aspects described below or in connection with one or more other processes described elsewhere herein.

In a first aspect, the uplink control channel or uplink signal is a physical uplink control channel or a sounding reference signal.

In a second aspect, alone or in combination with the first aspect, the default spatial relation is determined based at least in part on receiving an indication of the default spatial relation from the UE as part of a procedure for initial configuration of the CC.

In a third aspect, alone or in combination with one or more of the first and second aspects, the default spatial relation is based at least in part on a spatial relation configured for an uplink resource of the CC.

In a fourth aspect, alone or in combination with one or more of the first through third aspects, the uplink resource is an actual uplink resource or a virtual uplink resource.

In a fifth aspect, alone or in combination with one or more of the first through fourth aspects, the uplink resource satisfies a condition relating to an identifier of the uplink resource.

In a sixth aspect, alone or in combination with one or more of the first through fifth aspects, the condition is that the uplink resource has the lowest identifier among uplink resources for which a spatial relation is configured for the CC.

In a seventh aspect, alone or in combination with one or more of the first through sixth aspects, the process includes determining that a spatial relation is not configured for any uplink resources of the CC; and determining the default spatial relation based at least in part on a spatial relation configured for an uplink resource of a different CC than the CC based at least in part on determining that a spatial relation is not configured for any uplink resources of the CC.

In an eighth aspect, alone or in combination with one or more of the first through seventh aspects, the default spatial relation is based at least in part on a spatial relation configured for an uplink resource of a different CC than the CC.

In a ninth aspect, alone or in combination with one or more of the first through eighth aspects, the uplink resource is an actual uplink resource or a virtual uplink resource.

In a tenth aspect, alone or in combination with one or more of the first through ninth aspects, the uplink resource satisfies a condition relating to an identifier of the uplink resource.

In an eleventh aspect, alone or in combination with one or more of the first through tenth aspects, the condition is that the uplink resource has the lowest identifier among uplink resources for which a spatial relation is configured for the different CC.

In a twelfth aspect, alone or in combination with one or more of the first through eleventh aspects, the different CC satisfies a condition relating to an identifier of the different CC.

In a thirteenth aspect, alone or in combination with one or more of the first through twelfth aspects, the condition is that the different CC has a lowest identifier among CCs of the UE for which a spatial relation is configured for an uplink resource.

In a fourteenth aspect, alone or in combination with one or more of the first through thirteenth aspects, the different CC is identified based at least in part on a first QCL property of the CC and a second QCL property of the different CC.

In a fifteenth aspect, alone or in combination with one or more of the first through fourteenth aspects, the process includes determining that a spatial relation is not configured for any uplink resources of any CC of the UE; and determining the default spatial relation based at least in part on a default TCI state activated for a downlink resource of a different CC than the CC based at least in part on determining that a spatial relation is not configured for any uplink resources of any CC of the UE.

In a sixteenth aspect, alone or in combination with one or more of the first through fifteenth aspects, the default spatial relation is based at least in part on a default TCI state activated for a downlink resource of a different CC than the CC.

In a seventeenth aspect, alone or in combination with one or more of the first through sixteenth aspects, the default spatial relation is determined based at least in part on receiving an indication, from the UE, of a CSI-RS or an SSB used by the UE to determine the default spatial relation.

In an eighteenth aspect, alone or in combination with one or more of the first through seventeenth aspects, the CC is an uplink-only CC.

In a nineteenth aspect, alone or in combination with one or more of the first through eighteenth aspects, the process includes determining that one or more pathloss reference signals are configured for the CC; and determining the default spatial relation for the uplink control channel or uplink signal for the CC further based at least in part on determining that one or more pathloss reference signals are configured for the CC.

In a twentieth aspect, alone or in combination with one or more of the first through nineteenth aspects, the process includes determining that no pathloss reference signals are configured for the CC; and determining the default spatial relation for the uplink control channel or uplink signal for the CC further based at least in part on determining that no pathloss reference signals are configured for the CC.

In a twenty-first aspect, alone or in combination with one or more of the first through twentieth aspects, the default spatial relation is determined based at least in part on a rule.

Although FIG. 6 shows example blocks of the process, in some aspects, the process may include additional blocks, fewer blocks, different blocks, or differently arranged blocks than those depicted in FIG. 6. Additionally or alternatively, two or more of the blocks of the process may be performed in parallel.

Figure 7:
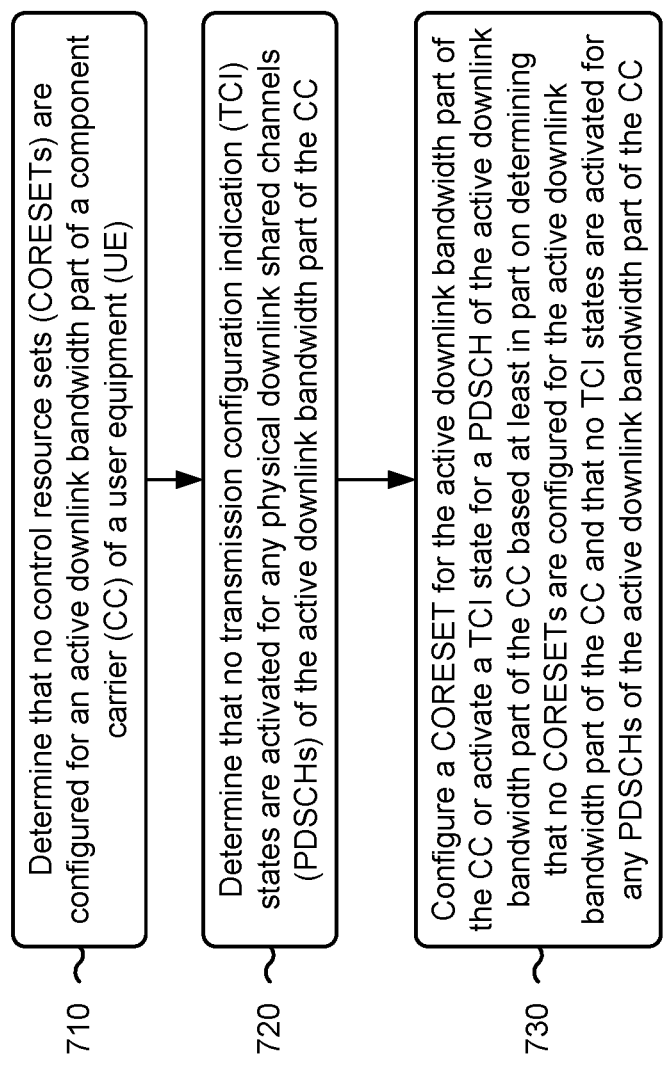
FIG. 7 is a flowchart illustrating an example process performed by a base station in accordance with various aspects of the present disclosure.

FIG. 7 is a flowchart illustrating an example process performed, for example, by a base station in accordance with various aspects of the present disclosure. The process is an example where the base station (for example, base station 110) performs operations associated with default spatial relation determination for an SRS or an uplink control channel beam.

As shown in FIG. 7, in some aspects, the process may include determining that no CORESETs are configured for an active downlink bandwidth part of a CC of a UE (block 710). For example, the base station (for example, using transmit processor 220, receive processor 238, controller/processor 240, memory 242, among other examples) may determine that no CORESETs are configured for an active downlink bandwidth part of a CC of a UE, as described above.

As further shown in FIG. 7, in some aspects, the process may include determining that no TCI states are activated for any PDSCHs of the active downlink bandwidth part of the CC (block 720). For example, the base station (for example, using transmit processor 220, receive processor 238, controller/processor 240, memory 242, among other examples) may determine that no TCI states are activated for any PDSCHs of the active downlink bandwidth part of the CC, as described above.

As further shown in FIG. 7, in some aspects, the process may include configuring a CORESET for the active downlink bandwidth part of the CC or activating a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC (block 730). For example, the base station (for example, using transmit processor 220, receive processor 238, controller/processor 240, memory 242, among other examples) may configure a CORESET for the active downlink bandwidth part of the CC or may activate a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC, as described above.

The process may include additional aspects, such as any single aspect or any combination of aspects described below or in connection with one or more other processes described elsewhere herein.

Although FIG. 7 shows example blocks of the process, in some aspects, the process may include additional blocks, fewer blocks, different blocks, or differently arranged blocks than those depicted in FIG. 7. Additionally or alternatively, two or more of the blocks of the process may be performed in parallel.

Figure 8:
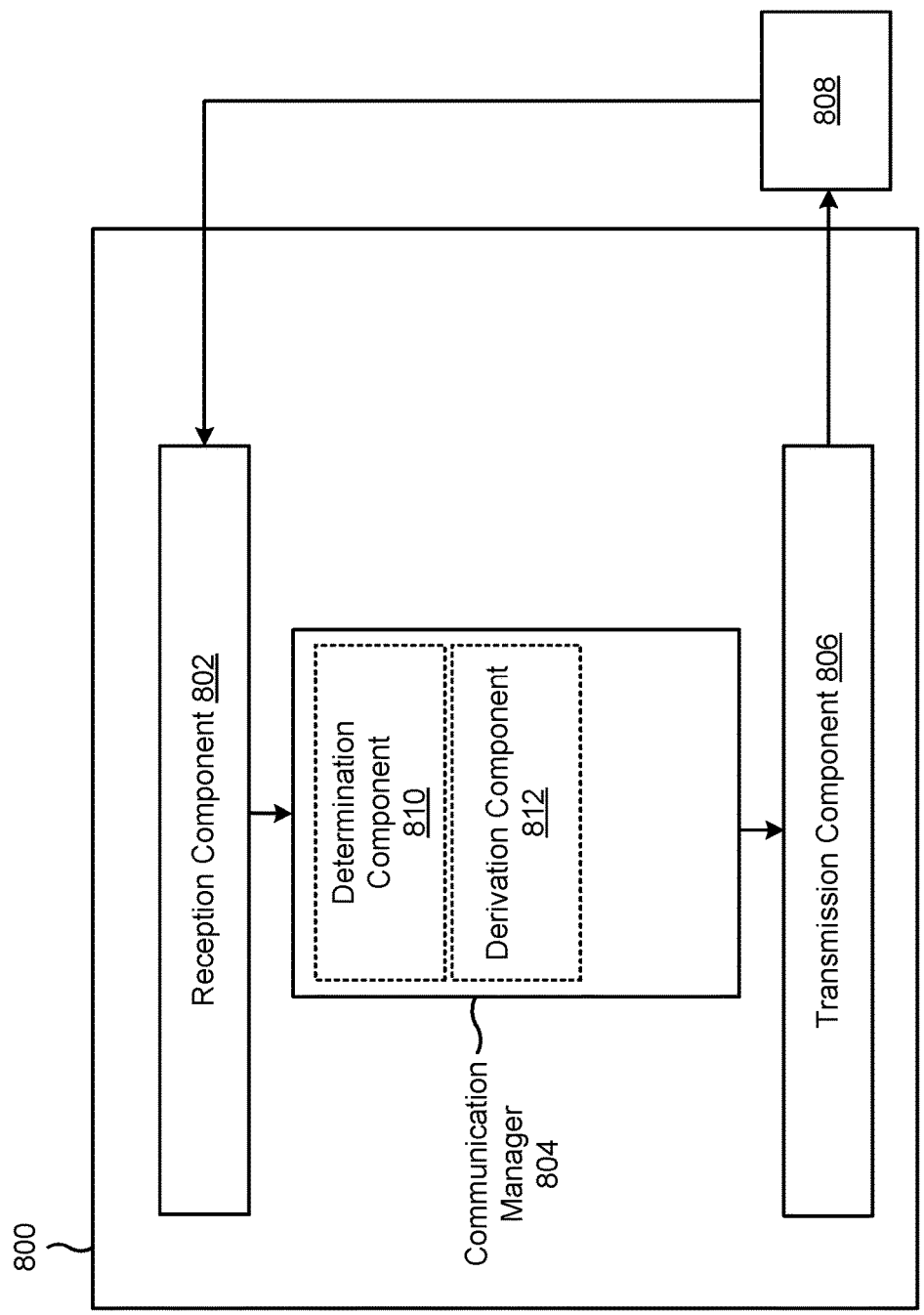
FIGS. 8-10 are block diagrams of example apparatuses for wireless communication in accordance with various aspects of the present disclosure.

FIG. 8 is a block diagram of an example apparatus 800 for wireless communication in accordance with various aspects of the present disclosure. The apparatus 800 may be a UE, or a UE may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIG. 4. Additionally or alternatively, the apparatus 800 may be configured to perform one or more processes described herein, such as the process of FIG. 5. In some aspects, the apparatus 800 may include one or more components of the UE described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE described above in connection with FIG. 2. In some aspects, the transmission component 806 may be co-located with the reception component 802 in a transceiver.

In some aspects, the communication manager 804 may include a controller/processor, a memory, or a combination thereof, of the UE described above in connection with FIG. 2. The communication manager 804 may determine that a CORESET is not configured for an active downlink bandwidth part of a CC of the UE. The communication manager 804 may determine that a TCI state is not activated for a PDSCH of the active downlink bandwidth part of the CC. The communication manager 804 may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC. In some aspects, the communication manager 804 may perform one or more operations described below as being performed by one or more components of the communication manager 804.

In some aspects, the communication manager 804 may include a set of components, such as a determination component 810, a derivation component 812, or a combination thereof. Alternatively, the set of components may be separate and distinct from the communication manager 804. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 810 may determine that a CORESET is not configured for an active downlink bandwidth part of a CC of the UE. The determination component 810 may determine that a TCI state is not activated for a PDSCH of the active downlink bandwidth part of the CC. The determination component 810 may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC. The transmission component 806 may transmit an indication of the default spatial relation to a base station as part of a procedure for initial configuration of the CC.

The determination component 810 may determine that a spatial relation is not configured for any uplink resources of the CC. The determination component 810 may determine the default spatial relation based at least in part on a spatial relation configured for an uplink resource of a different CC than the CC based at least in part on determining that a spatial relation is not configured for any uplink resources of the CC. The determination component 810 may determine that a spatial relation is not configured for any uplink resources of any CC of the UE. The determination component 810 may determine the default spatial relation based at least in part on a default TCI state activated for a downlink resource of a different CC than the CC based at least in part on determining that a spatial relation is not configured for any uplink resources of any CC of the UE. The transmission component 806 may transmit an indication, to a base station, of the strongest measured CSI-RS or the strongest measured SSB.

The determination component 810 may determine that one or more pathloss reference signals are configured for the CC. The determination component 810 may determine the default spatial relation for the uplink control channel or uplink signal for the CC further based at least in part on determining that one or more pathloss reference signals are configured for the CC. The determination component 810 may determine that no pathloss reference signals are configured for the CC. The determination component 810 may determine the default spatial relation for the uplink control channel or uplink signal for the CC further based at least in part on determining that no pathloss reference signals are configured for the CC. The derivation component 812 may derive one or more power control parameters for the uplink control channel or uplink signal using a downlink reference signal based at least in part on determining that no pathloss reference signals are configured for the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
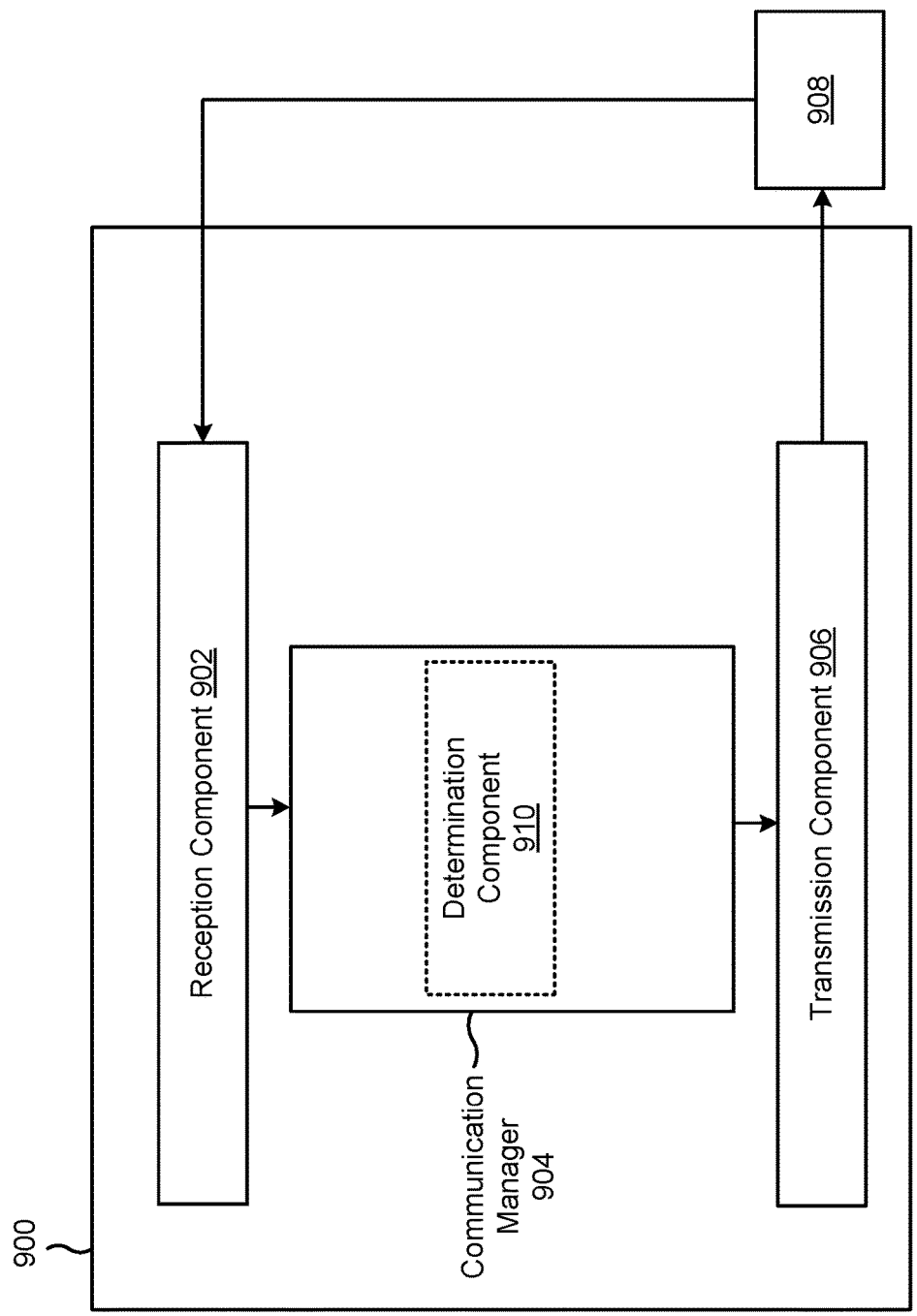

FIG. 9 is a block diagram of an example apparatus 900 for wireless communication in accordance with various aspects of the present disclosure. The apparatus 900 may be a base station, or a base station may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIG. 4. Additionally or alternatively, the apparatus 900 may be configured to perform one or more processes described herein, such as the process of FIG. 6, the process of FIG. 7, or a combination thereof. In some aspects, the apparatus 900 may include one or more components of the base station described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the base station described above in connection with FIG. 2. In some aspects, the transmission component 906 may be co-located with the reception component 902 in a transceiver.

The communication manager 904 may determine that a CORESET is not configured for an active downlink bandwidth part of a CC of a UE. The communication manager 904 may determine that a TCI state is not activated for a PDSCH of the active downlink bandwidth part of the CC. The communication manager 904 may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC. In some aspects, the communication manager 904 may include a controller/processor, a memory, a scheduler, a communication unit, or a combination thereof, of the base station described above in connection with FIG. 2.

In some aspects, the communication manager 904 may include a set of components, such as a determination component 910. Alternatively, the set of components may be separate and distinct from the communication manager 904. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 910 may determine that a CORESET is not configured for an active downlink bandwidth part of a CC of a UE. The determination component 910 may determine that a TCI state is not activated for a PDSCH of the active downlink bandwidth part of the CC. The determination component 910 may determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC. In some aspects, the determination component 910 may include a controller/processor, a memory, a scheduler, a communication unit, or a combination thereof, of the base station described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
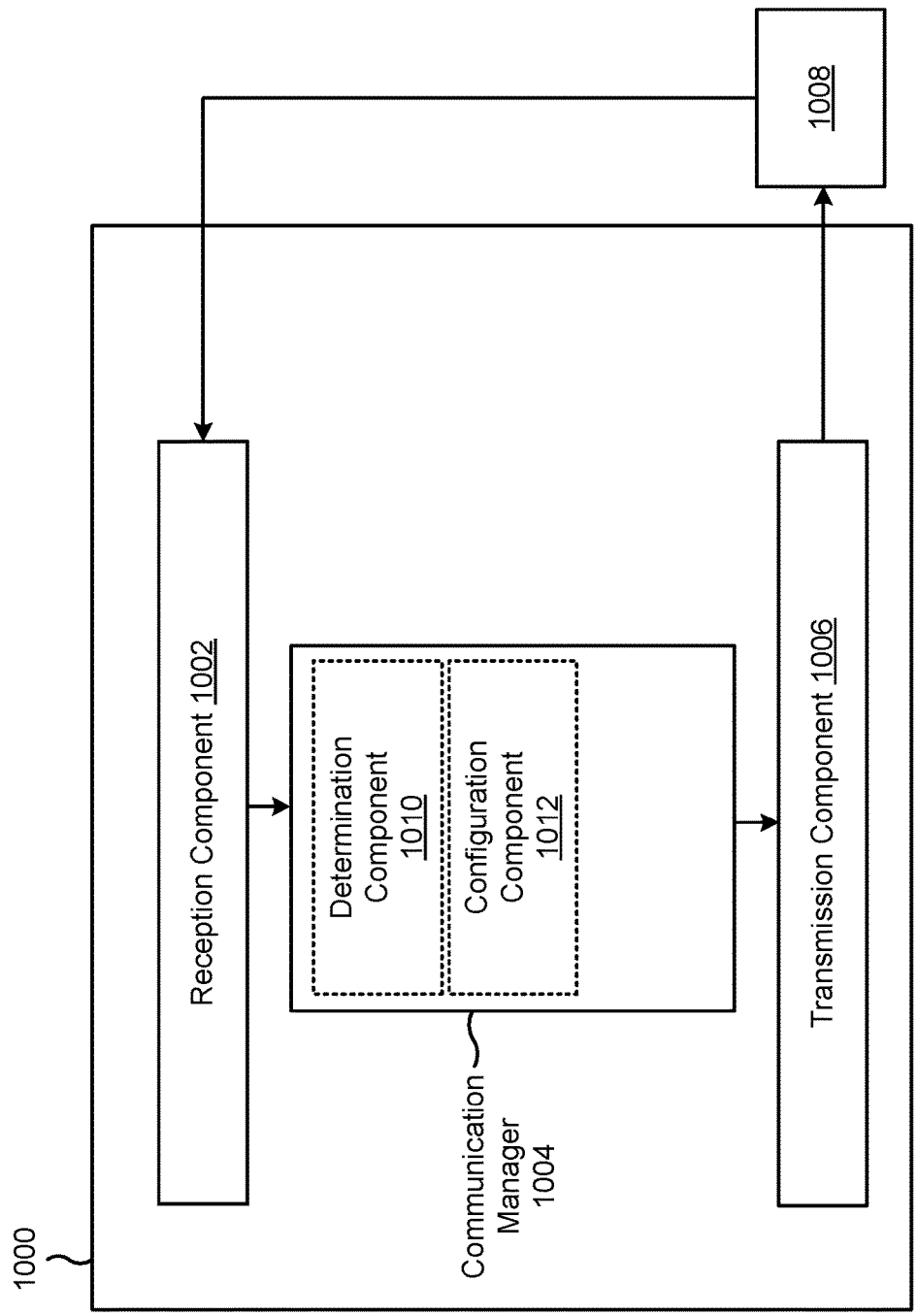

FIG. 10 is a block diagram of an example apparatus 1000 for wireless communication in accordance with various aspects of the present disclosure. The apparatus 1000 may be a base station, or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIG. 4. Additionally or alternatively, the apparatus 1000 may be configured to perform one or more processes described herein, such as the process of FIG. 6, the process of FIG. 7, or a combination thereof. In some aspects, the apparatus 1000 may include one or more components of the base station described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may determine that no CORESETs are configured for an active downlink bandwidth part of a CC of a UE. The communication manager 1004 may determine that no TCI states are activated for any PDSCHs of the active downlink bandwidth part of the CC. The communication manager 1004 may configure a CORESET for the active downlink bandwidth part of the CC or may activate a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC. In some aspects, the communication manager 1004 may include a controller/processor, a memory, a scheduler, a communication unit, or a combination thereof, of the base station described above in connection with FIG. 2.

In some aspects, the communication manager 1004 may include a set of components, such as a determination component 1010, a configuration component 1012, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1010 may determine that no CORESETs are configured for an active downlink bandwidth part of a CC of a UE. The determination component 1010 may determine that no TCI states are activated for any PDSCHs of the active downlink bandwidth part of the CC. The configuration component 1012 may configure a CORESET for the active downlink bandwidth part of the CC or may activate a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC. In some aspects, the determination component 1010 and/or the configuration component 1012 may include a controller/processor, a memory, a scheduler, a communication unit, or a combination thereof, of the base station described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a control resource set (CORESET) is not configured for an active downlink bandwidth part of a component carrier (CC) of the UE;
    determining that a transmission configuration indication (TCI) state is not activated for a physical downlink shared channel (PDSCH) of the active downlink bandwidth part of the CC; and
    determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

2. The method of claim 1, wherein the uplink control channel or uplink signal is a physical uplink control channel or a sounding reference signal.

3. The method of claim 1, further comprising transmitting an indication of the default spatial relation to a base station as part of a procedure for initial configuration of the CC.

4. The method of claim 1, wherein the determination of the default spatial relation is based at least in part on a spatial relation configured for an uplink resource of the CC.

5. The method of claim 4, wherein the uplink resource is an actual uplink resource.

6. The method of claim 4, wherein the uplink resource is a virtual uplink resource.

7. The method of claim 4, wherein the uplink resource has the lowest identifier among uplink resources for which a spatial relation is configured for the CC.

8. The method of claim 1, further comprising determining that a spatial relation is not configured for any uplink resources of the CC, wherein the determination of the default spatial relation is based at least in part on a spatial relation configured for an uplink resource of a different CC than the CC based at least in part on determining that a spatial relation is not configured for any uplink resources of the CC.

9. The method of claim 8, wherein the uplink resource is an actual uplink resource.

10. The method of claim 8, wherein the uplink resource is a virtual uplink resource.

11. The method of claim 8, wherein the uplink resource has the lowest identifier among uplink resources for which a spatial relation is configured for the different CC.

12. The method of claim 8, wherein the different CC has a lowest identifier among CCs of the UE for which a spatial relation is configured for an uplink resource.

13. The method of claim 8, further comprising determining the different CC based at least in part on a first quasi co-location (QCL) property of the CC and a second QCL property of the different CC.

14. The method of claim 1, further comprising determining that a spatial relation is not configured for any uplink resources of any CC of the UE, wherein the determination of the default spatial relation is based at least in part on a default TCI state activated for a downlink resource of a different CC than the CC based at least in part on determining that a spatial relation is not configured for any uplink resources of any CC of the UE.

15. The method of claim 1, wherein the determination of the default spatial relation is based at least in part on a default TCI state activated for a downlink resource of a different CC than the CC.

16. The method of claim 1, wherein the determination of the default spatial relation is based at least in part on a TCI state of a strongest measured channel state information reference signal (CSI-RS) or a strongest measured synchronization signal block (SSB).

17. The method of claim 16, further comprising transmitting an indication, to a base station, of the strongest measured CSI-RS or the strongest measured SSB.

18. The method of claim 1, wherein the CC is an uplink-only CC.

19. The method of claim 1, further comprising determining that one or more pathloss reference signals are configured for the CC, wherein the determination of the default spatial relation is based at least in part on determining that one or more pathloss reference signals are configured for the CC.

20. The method of claim 1, further comprising determining that no pathloss reference signals are configured for the CC, wherein the determination of the default spatial relation is based at least in part on determining that no pathloss reference signals are configured for the CC.

21. The method of claim 20, further comprising deriving one or more power control parameters for the uplink control channel or uplink signal using a downlink reference signal based at least in part on determining that no pathloss reference signals are configured for the UE.

22. The method of claim 21, wherein the downlink reference signal is on the CC if the CC has a downlink reference signal configured, or is on a different CC if the CC does not have a downlink reference signal configured.

23. A method of wireless communication performed by a base station, comprising:
   determining that a control resource set (CORESET) is not configured for an active downlink bandwidth part of a component carrier (CC) of a user equipment (UE);
   determining that a transmission configuration indication (TCI) state is not activated for a physical downlink shared channel (PDSCH) of the active downlink bandwidth part of the CC; and
   determining a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

24. The method of claim 23, wherein the uplink control channel or uplink signal is a physical uplink control channel or a sounding reference signal.

25. The method of claim 23, wherein the default spatial relation is determined based at least in part on receiving an indication of the default spatial relation from the UE as part of a procedure for initial configuration of the CC.

26. A method of wireless communication performed by a base station, comprising:
   determining that no control resource sets (CORESETs) are configured for an active downlink bandwidth part of a component carrier (CC) of a user equipment (UE);
   determining that no transmission configuration indication (TCI) states are activated for any physical downlink shared channels (PDSCHs) of the active downlink bandwidth part of the CC; and
   configuring a CORESET for the active downlink bandwidth part of the CC or activating a TCI state for a PDSCH of the active downlink bandwidth part of the CC based at least in part on determining that no CORESETs are configured for the active downlink bandwidth part of the CC and that no TCI states are activated for any PDSCHs of the active downlink bandwidth part of the CC.

27. A user equipment (UE) for wireless communication, comprising:
   a memory; and
   one or more processors operatively coupled to the memory, the memory and the one or more processors configured to:
      determine that a control resource set (CORESET) is not configured for an active downlink bandwidth part of a component carrier (CC) of the UE;
      determine that a transmission configuration indication (TCI) state is not activated for a physical downlink shared channel (PDSCH) of the active downlink bandwidth part of the CC; and
      determine a default spatial relation for an uplink control channel or uplink signal for the CC based at least in part on determining that the CORESET is not configured for the active downlink bandwidth part of the CC and that the TCI state is not activated for the PDSCH of the active downlink bandwidth part of the CC.

28. The UE of claim 27, wherein the uplink control channel or uplink signal is a physical uplink control channel or a sounding reference signal.

29. The UE of claim 27, wherein the UE is further configured to transmit an indication of the default spatial relation to a base station as part of a procedure for initial configuration of the CC.

30. The UE of claim 27, wherein the one or more processors, when determining the default spatial relation, are configured to determine the default spatial relation based at least in part on a spatial relation configured for an uplink resource of the CC or of another CC that is different from the CC.

* * * * *